July 17, 1956 P. METZ 2,755,342

PORTABLE RADIO PHONOGRAPH

Filed Nov. 15, 1954

INVENTOR.
PAUL METZ

BY

Ostrolenk & Faber

ATTORNEYS

United States Patent Office 2,755,342
Patented July 17, 1956

2,755,342

PORTABLE RADIO PHONOGRAPH

Paul Metz, Furth, Bavaria, Germany, assignor to Transformatoren- und Apparatefabrik Paul Metz, Furth, Bavaria, Germany, a corporation of Germany Application November 15, 1954, Serial No. 468,604

10 Claims. (Cl. 179—100.11)

The invention relates to a portable radio mounted in a carrying case. In such equipment it has been a disadvantage that at such times at which radio reception is not possible for local reasons or because the program did not appear attractive to the listener, the equipment was not in use.

This invention proposes to remedy this disadvantage by providing a record player mechanism with a drviing motor fed by a built-in source of current for a record turntable located on the outside of the portable case.

An important object of my invention is the arrangement of the phonograph turntable and the tuning dial and the manually operable tuning member for the radio so they are coaxial with the turntable located within the periphery of the tuning member of the radio, the turntable being provided with a raised friction surfaced portion in order that a record may be carried thereby free of the radio tuning member.

By this invention a portable radio which hitherto was suitable only for radio reception fulfills the requirements of musical transmission not locally conditioned. The possibility of playing records gives the listener a choice of record selection according to his preference without any appreciable increase in dimensions or weight of the portable equipment.

Other advantages of the invention are explained in the following specification and drawings in which.

Figure 1:
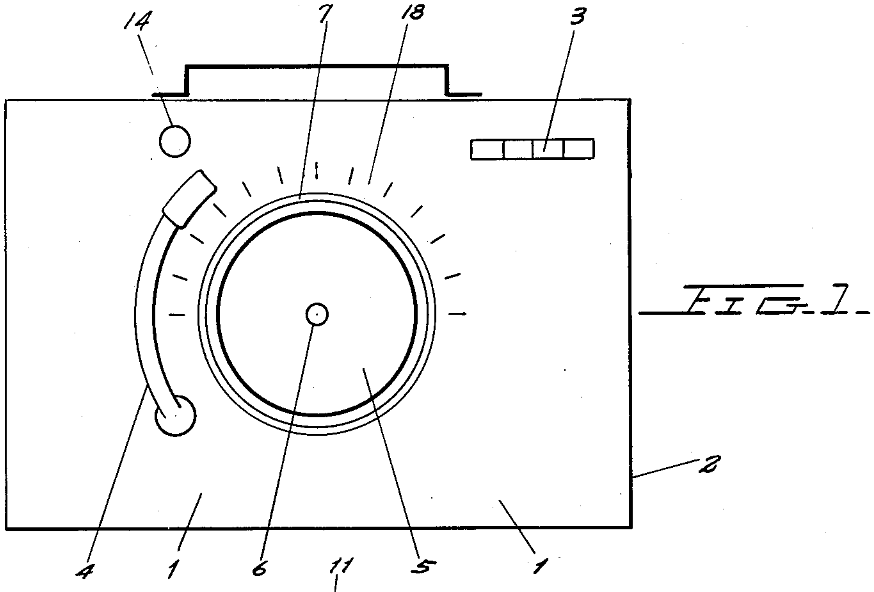
Figure 1 shows a schematic top view of my novel portable radio phonograph.

Referring to the figures, my novel unit is housed in a portable case 2 having a front wall 1. Push buttons 3 are provided to switch various elements of the structure to energize either the radio or the phonograph or other elements which are not here pertinent. A phonograph pick-up arm 4 is pivotally mounted in the front wall of the carrying case 1.

It will here be understood that the front wall 1 of the carrying case may be provided with an appropriate cover, if desired, which cover will be recessed to permit all of the elements on the front wall 1 to be suitably housed when the cover is closed and which may also contain provision for storage of records.

The turntable 5 with its spindle 6 is located within the periphery of the circular tuning member 7 for the radio and is coaxial therewith. The lower extension 10 of the spindle 6 passes through rotatably mounted bushing 20 which supports the radio tuning member 7.

The tuning member 7 is rotatable with respect to the stationary dial 18 and is, therefore, provided with a lubber mark 22, the registry of which with respect to the tuning dial 18 provides the indication of the particular frequency to which the radio is tuned.

The radio tuning member 7 may be coupled with an appropriate tuning device 9 by means of pulley 23 on bushing 20 connected by cord 8 to pulley 24 of the tuning member 9. The tuning member 9 may, of course, be a rotatably operable and adjustable inductive or capacitive tuner.

Figure 3:
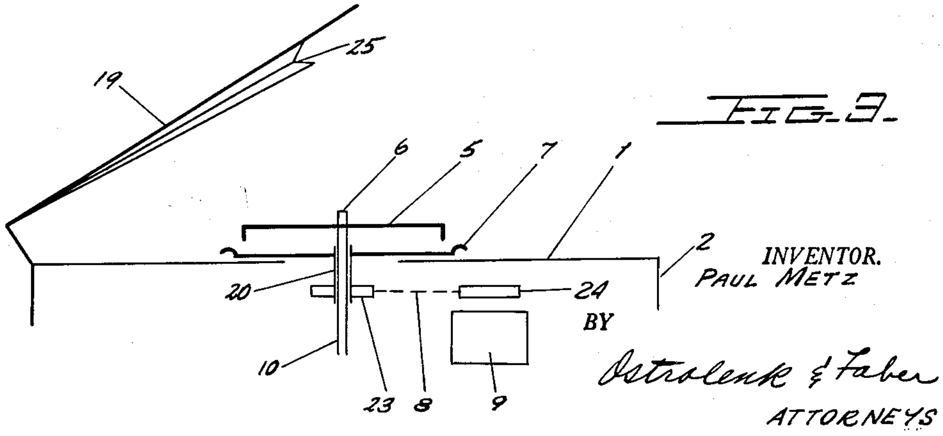
Figure 3 is a schematic cross-section of my novel apparatus.

The turntable 5 is preferably provided with a surface which may be annular having a high co-efficient of friction so that any record placed thereon would be definitely rotated together with the turntable. Such a friction member may consist of a rubber gasket incorporated in the surface of the turntable 5 so that either the entire turntable disc 5 is higher than the tuning member 7 as shown in Figure 3 or at least the gasket protrudes above the level of the curved periphery of the tuning member 7.

Figure 2:
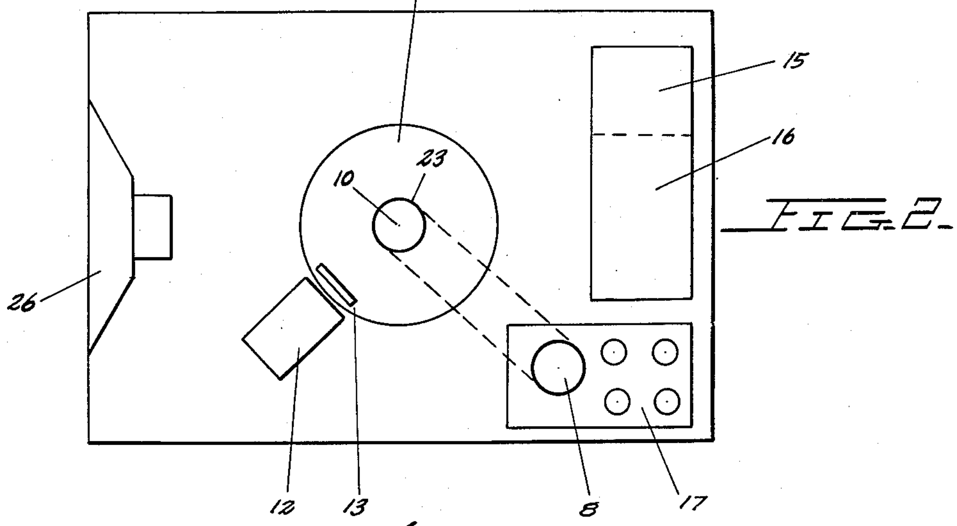
Figure 2 shows a schematic rear view with the cover removed.

Figure 2 which shows a schematic view of the underside of front wall 1 shows that the turntable is connected by means of spindle extension 10 (see also Figure 3) to a drive disc 11. Motor 12 is provided with friction wheel 13, the edge of which engages the surface of the drive disc 11. The friction wheel 13 which may be a rubber tired metal wheel is, therefore, arranged normal to the surface of the drive disc 11 with the axis of the friction wheel extending parallel to a radius of the drive disc.

The operation of motor 12 which is preferably a minimum input D. C. motor operated by batteries contained within the housing 15 through the friction wheel 13 drives the disc 11, thereby driving the spindle extension 10 and the turntable 5.

As will be obvious from an examination of Figure 2, the speed of rotation of the drive disc 11 and the turntable 5 may be regulated by moving the motor 12 and its friction drive wheel 13 axially in a direction parallel to a radius of the drive disc 11 toward or away from center to increase or decrease the speed of the drive disc 11 and the turntable 5.

An appropriate connection may be provided between the operating adjusting knob 14 on the upper surface of the front wall 1 of the case and the mounting for motor 12 to permit this type of adjustment of the physical relationship of the motor 12 and friction wheel 13 with respect to the drive disc 11.

Provision is also made within the casing as shown at 15 and 16 to house appropriate sources of electrical energy for both the motor and the radio. Thus, the container 15 may contain appropriate miniature batteries for operating the motor 12. The container 16 may contain appropriate batteries for operating the radio apparatus 17 which also includes the amplifying apparatus.

Members 15 and 16 are arranged so that they may readily be removed and replaced by appropriate current transforming and conversion apparatus to match the particular local electrical power source.

As previously pointed out, it may be preferable to recess the outer surface 1 and to provide the cover 19, which cover contains a compartment 25 for records.

It is also possible as may readily be understood to provide the apparatus with a sound pick-up connector which may be operated in connection with an outside source. Thus, the output of the pick-up arm 4 may be connected to another amplifier and output loudspeaker, or the pick-up from an external source may be connected to the amplifier in the radio apparatus 17 and then to the loudspeaker 26.

The parts may be arranged in various ways all within the concept of the present invention; and since the means of connection between the batteries and the amplifier, the pick-up arm and the amplifier, the amplifier with tuning means on its input side and the amplifier with a loudspeaker on its output side are all well known, these specific connections are not shown.

Also, since methods of switching from a connection between the tuning means and the amplifier to a connection between the pick-up arm 4 and the amplifier are now well known in the art, these specific connections have not been shown except to point out that they may be operated by the switch buttons 3.

Other means may be provided for regulating the speed of the turntable besides that of moving the motor 12 and the idler 13. Or in the event that reliance may be placed on stability of operation, such adjustment means may be omitted.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A combined radio phonograph comprising a rotatable tuning member for the radio; a turntable for the phonograph; said turntable being coaxial with and in a plane parallel to that of the rotatable tuning member.

2. A combined radio phonograph comprising a rotatable tuning member for the radio; a turntable for the phonograph; said turntable being coaxial with and in a plane parallel to that of the rotatable tuning member, said rotatable tuning member extending radially beyond the periphery of said turntable, said rotatable tuning member comprising a disc-like element fully surrounding the lower periphery of said turntable; including a cabinet on which said turntable is mounted, shaft means extending out of an aperture in said cabinet to support said turntable, said tuning member serving as a dust barrier for said aperture.

3. A combined radio phonograph comprising a rotatable tuning member for the radio; a turntable for the phonograph; said turntable being coaxial with and in a plane parallel to that of the rotatable tuning member, said rotatable tuning member extending radially beyond the periphery of said turntable and a portion of the upper surface of the turntable extending above the upper surface of the rotatable tuning member, said rotatable tuning member comprising a disc-like element fully surrounding the lower periphery of said turntable; including a cabinet on which said turntable is mounted, shaft means extending out of an aperture in said cabinet to support said turntable, said tuning member serving as a dust barrier for said aperture.

4. A combined radio phonograph comprising a rotatable tuning member for the radio; a turntable for the phonograph; said turntable being coaxial with and in a plane parallel to that of the rotatable tuning member, said rotatable tuning member extending radially beyond the periphery of said turntable and a portion of the upper surface of the turntable extending above the upper surface of the rotatable tuning member, said portion of said upper surface of the turntable carrying an annular friction member for engagement with the undersurface of a phonograph disc, said rotatable tuning member comprising a disc-like element fully surrounding the lower periphery of said turntable; including a cabinet on which said turntable is mounted, shaft means extending out of an aperture in said cabinet to support said turntable, said tuning member serving as a dust barrier for said aperture.

5. A combined radio phonograph comprising a rotatable tuning member for the radio; a turntable for the phonograph; said turntable being coaxial with and in a plane parallel to that of the rotatable tuning member; said turntable having a central spindle; said rotatable tuning member having a central hollow shaft; said turntable spindle being rotatably mounted in said hollow shaft and extending beyond the lower end of said hollow shaft, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

6. A combined radio phonograph comprising a rotatable tuning member for the radio; a turntable for the phonograph; said turntable being coaxial with and in a plane parallel to that of the rotatable tuning member; said turntable having a central spindle; said rotatable tuning member having a central hollow shaft; said turntable spindle being rotatably mounted in said hollow shaft and extending beyond the lower end of said hollow shaft; a radio tuner; a connection between said hollow shaft and said radio tuner, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

7. A combined radio phonograph comprising a rotatable tuning member for the radio; a turntable for the phonograph; said turntable being coaxial with and in a plane parallel to that of the rotatable tuning member; said turntable having a central spindle; said rotatable tuning member having a central hollow shaft; said turntable spindle being rotatably mounted in said hollow shaft and extending beyond the lower end of said hollow shaft; a drive member secured to the lower end of said spindle; a motor; and a connection between said motor and said drive member, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

8. A combined radio phonograph comprising a rotatable tuning member for the radio; a turntable for the phonograph; said turntable being coaxial with and in a plane parallel to that of the rotatable tuning member; said turntable having a central spindle; said rotatable tuning member having a central hollow shaft; said turntable spindle being rotatably mounted in said hollow shaft and extending beyond the lower end of said hollow shaft; a radio tuner; a connection between said hollow shaft and said radio tuner; a drive member secured to the lower end of said spindle; a motor; and a connection between said motor and said drive member, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

9. A combined radio phonograph comprising a rotatable tuning member for the radio; a turntable for the phonograph; said turntable being coaxial with and in a plane parallel to that of the rotatable tuning member, said rotatable tuning member extending radially beyond the periphery of said turntable, said turntable having a spindle extending through the center of rotation of said rotatable tuning member, a drive member secured to the lower end of said spindle; a motor; and a connection between said motor and said drive member, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

10. A combined radio phonograph comprising a rotatable tuning member for the radio; a turntable for the phonograph; said turntable being coaxial with and in a plane parallel to that of the rotatable tuning member, said rotatable tuning member extending radially beyond the periphery of said turntable, said turntable having a spindle extending through the center of rotation of said rotatable tuning member, a drive member secured to the lower end of said spindle; a motor; and a connection between said motor and said drive member; said drive member comprising a disc secured to said spindle substantially parallel to said turntable; an idler in frictional engagement with said disc and normal thereto with the axis of rotation of said idler parallel to a radius of said disc; said motor driving said idler; said idler being shiftable toward and away from the center of the disc to vary the speed of rotation of said disc and turntable, said rotatable tuning member comprising a disc element fully surrounding the lower periphery of said turntable; including a cabinet having an aperture through which said spindle extends to support said turntable, said tuning member being disposed adjacent said aperture to serve as a dust barrier therefor.

References Cited in the file of this patent

UNITED STATES PATENTS

| | | |
|---|---|---|
| 2,081,752 | Linsell | May 25, 1937 |
| 2,597,238 | Gerber et al. | May 20, 1952 |